United States Patent Office — 3,524,812, Patented Aug. 18, 1970

3,524,812
METHOD FOR DECREASING THE BIOCIDAL EFFECT OF BROMONITROSTYRENE
Bernard F. Shema, Glenside, and Robert H. Brink, Swarthmore, Pa., assignors to Betz Laboratories, Inc., Trevose, Pa., a corporation of Pennsylvania
No Drawing. Filed Dec. 16, 1968, Ser. No. 784,229
Int. Cl. C02c 5/04
U.S. Cl. 210—63                                11 Claims

ABSTRACT OF THE DISCLOSURE

The present invention is directed to a method of detoxifying bromonitrostyrene. The method comprises contacting and thereby reacting bromonitrostyrene with a sufficient quantity of a compound which is capable of oxidizing the bromonitrostyrene to render it substantially non-toxic. The compounds react with the bromonitrostyrene in such a way as to substantially decharacterize it to significantly affect the toxicity of this compound with regard to existing life and more specifically to marine life, such as the fish and plant life which exists in the streams where industrial waste waters are commonly disposed. The compounds which have been found operable for this purpose are oxidizing agents such as the organic and inorganic sulfites and compounds such as hydrogen peroxide and potassium permanganate.

BACKGROUND OF THE INVENTION

As is well known and as is more fully explained in co-pending U.S. application Ser. No. 699,355, filed on Jan. 22, 1968, the formation of slime by microorganisms is a problem which attends both cooling water systems and pulp and paper mill systems. In both once-through and re-circulating cooling systems which employ large quantities of water as a cooling medium, the formation of slime by microorganisms is an extensive and constant problem. Because the technique by which water is cooled in cooling towers is as it is, air borne organisms are readily entrained in the water during the cooling process. These organisms find this warm medium an ideal environment for growth and multiplication. For example in the cooling tower proper, aerobic and algae organisms flourish in the tower itself while other organism colonies grow and multiply in such areas as the tower sump and the piping and passages of the cooling system.

As is apparent, the slime which is formed acts to deteriorate the tower structure in the case of wooden towers and also when deposited on the metal surfaces of the cooling systems, the deposits promote corrosion. In addition, slime when carried through the cooling system, tends to plug and foul lines, valves, drainers, etc. and to form deposits on the heat exchange surfaces. Thus, under these circumstances, the heat transfer or the cooling system efficiency is greatly reduced. If one considers that a typical cooling tower affects approximately a ten degree cooling of the water, it will be appreciated that any decrease in this cooling efficiency represents a significant deficit in the operation.

The foregoing is equally true with respect to pulp and paper mill systems. Because these systems operate at conditions which are favorable for slime and microorganism growth, fouling and plugging by the growth of slime are also encountered in great frequency. Of greater significance, however, is the fact that the slime or microorganism growth becomes entrained in the paper to produce breakage which necessitates a shutting down of the machines. Each time that a machine is shut down for slime-breaks there is a great loss in production time since the machines must be washed down and the problems which cause the shutdown have to be investigated. Moreover, if the slime eventually becomes structurally incorporated in the paper, the paper grade is greatly reduced because of the discolorations and holes which the slime effectuates.

Because of this attendant problem in both cooling water systems and pulp and paper systems, many materials have been recommended in order to eliminate or to curb the slime or microorganism growth. These materials which are more commonly referred to as biocides, are evaluated on a cost performance index. The cost performance index of any biocide is derived from the basic cost of the material, its effectiveness per unit of weight, the duration of its biocidal or biostatic effect in the system treated and the ease and frequency of its addition to the system treated. Before the advent of bromonitrostyrene as discussed and claimed in co-pending application Ser. No. 699,355, none of the commercially available biocides have exhibited a prolonged biocidal effect. Instead their effectiveness is rapidly reduced as the result of chemical reaction to yield reaction products of reduced effectiveness. In many instances, the chemical reaction is catalyzed by the physical conditions under which the biocide must operate. It can be appreciated that the discovery of a biocide which would not only have a desirable cost performance index but also possess an effectiveness which increased during the prolonged exposure of the systems treated would be highly desirable.

Just recently as set forth in the above-identified application the discovery was made that bromonitrostyrene or beta-bromo-beta-nitrostyrene having the formula $C_6H_5CH\!=\!CBrNO_2$ fulfills the basic two prerequisites of a biocide.

More specifically, unlike other biocides bromonitrostyrene exhibits a biocidal activity which increases with time during its presence in the system which is treated. However, although this characteristic of bromonitrostyrene is highly desirable when the biocide is utilized for treatment of cooling water systems or pulp and paper systems, it is undesirable when the waste waters of these systems are to be disposed of and passed to waste. For example, in a cooling water system there is generally a blowdown in order to eliminate from the system any suspended particles or dirt which has accumulated in the system. The water ejected by the blowdown is customarily either emptied into a settling tank and then discharged by addition to a stream or river or the water is directly discharged thereto. Similarly, in pulp and paper systems, the waste water is conveniently disposed of by addition to streams, rivers or ponds.

In recent years there has been a great concern with respect to the waste products which have been disposed of by addition to the natural waters. As is apparent, many materials which are utilized in industrial systems can have a deleterious effect on the marine life which exists in these waters. This concern has been stimulated by the municipal, state and federal authorities, who have either already enacted legislation in order to eliminate the pollution of our natural waters or who are in the process of promulgating these regulations. The regulations and legislations enacted by the respective authorities are becoming more and more stringent with the ultimate goal being the prohibition of the addition of any material to natural waters which might have even an insignificant effect on the life which exists therein. The basis for the regulations apparently is predicated upon the fact that although many materials do not have an immediate effect on the life which exists therein, the materials may have a long range cumulative effect. Accordingly, it would be desirable to utilize in any industrial system, materials which either have been detoxified in use or materials which can easily be detoxified after use and prior to disposal.

Accordingly, it is to this problem that the present invention is directed and particularly with respect to bromonitrostyrene. As earlier stated, bromonitrostyrene is not only effective in controlling microoragnism growth but the compound also has the characteristic of becoming more effective with its residence time in the system being treated. Thus, it is apparent that the material itself is not decomposed or detoxified during its use in the system. If, for example, the water obtained by blowdown of a cooling system or the waste water of a pulp and paper system contained bromonitrostyrene, it can be assumed that this material would still be effective when it is disposed along with the waste waters into the natural waters.

Accordingly, an object of the present invention is to provide a method to neutralize or to significantly decrease the toxic effect of the bromonitrostyrene contained in effluent waste waters.

GENERAL DESCRIPTION OF THE INVENTION

Applicants discovered that if the water containing bromonitrostyrene was reacted with a compound capable of oxidizing the bromonitrostyrene, the biocide is decharacterized to effectively produce a compound which is relatively ineffective as a biocide and which is substantially non-toxic to animal, fish or plant life. The oxidizing agents which are used according to the present invention are preferably the water-soluble inorganic or organic sulfite compounds or oxidizing agents such as hydrogen peroxide and potassium permanganate. The sulfites which have been found to be most successful in use from the standpoint of reaction time, effectiveness, and cost wise are the alkali metal sulfites such as the sodium, potassium and lithium sulfites. Included in the terminology "alkali metal sulfite" for the purpose of this invention is ammonium sulfite. The term sulfites for the purpose of the present disclosure includes the sulfites such as sodium sulfite, the bisulfites such as sodium bisulfite and the hydrosulfite such as sodium hydrosulfite.

The effluent water from the systems may be treated in many manners and at any appropriate time prior to its disposition. For example, the waste water containing the bromonitrostyrene may be directed to flow through a container, tank or a similar holding device which contains the sulfite in powdered, briquette or pellet form. Once the waste water has passed through the holding tank, it can then be emptied directly into the receiving waters.

As an alternative method, the sulfite may be added to the waste water in the form of a solution. Depending of course, upon the character of the sulfite itself, the solution may be in the form of aqueous solution or an organic solvent solution. The aqueous solution is preferable for a number of reasons. The aqueous solution is more economical since there is not the added cost of an organic solvent; the aqueous solution is easily prepared and stored; a more uniform distribution of the sulfite within the waste water is assured because of the common solvent used. This even distribution of the sulfite insures that the reaction between the oxidizing agent and the bromonitrostyrene is affected rapidly and completely. With respect to the latter, it is apparent and dependent upon the objectives desired, the amount of oxidizing agent contained in the solution can be sufficient to either completely inhibit the biocidal character of bromonitrostyrene or to significantly decrease this characteristic. Generally if the biocide is reacted with from about 05 to 30 parts by weight of said oxidizing agent and preferably from about 1 to 13 parts by weight per part of biocide, the detoxification of the bromonitrostyrene is completely affected.

The bromonitrostyrene is generally employed in quantities of from 1 to 2000 parts by weight for each one million parts by weight of the water in the system which is being treated and is preferably employed in quantities of from 5 to 100 p.p.m. A typical system such as a cooling water system will contain from 5 to 100 parts by weight of bromonitrostyrene for each one million parts by weight of the cooling water contained in the cooling system. If, for example, the oxidizing agent is added to the waste water in the form of a solution, the determining factors as to how much of the sulfite is added is dependent upon the quantity of the waste water and the content of the bromonitrostyrene contained in the waste water. A sulfite, for example, generally reacts on a 1 to 1 ratio with the bromonitrostyrene. Accordingly, in order to inhibit completely the biocidal effect of bromonitrostyrene, the type of oxidizing agent utilized must be considered together with its effectiveness. In some instances a lower weight ratio of the oxidizing agent may be utilized and this again is dependent upon the oxidizing capacities of the particular agent used.

As earlier described from 0.5 to 30 and preferably from 1 to 13 parts by weight of the oxidizing agent per part by weight of the bromonitrostyrene has proven to be quite effective in rendering the biocide relatively non-toxic. The rection time or the time necessary for this purpose is dependent upon a number of factors such as the concentration of the oxidizing agent utilized with respect to the concentration of the biocide in the waste water. These conditions can easily be ascertained by the worker once he has been appraised of the general concept of the invention.

The solvents other than water which may be employed for the purpose of producing either solutions for the oxidizing agent or emulsions thereof include the petroleum hydrocarbon solvents, isopropanol and dimethyl formamide. In addition, such agents as solubilizing, dispersing, wetting and emulsifying agents such as alkylaryl-polyether-alcohols, polyethylene glycols, etc., may also be employed to facilitate the disbursing of the oxidizing compound in the desired solvent and in the water to be treated.

Having described the invention generally, specific embodiments thereof will follow. However, it is to be understood that these embodiments are included as representative and are not intended to be limitative of the invention as a whole.

SPECIFIC EMBODIMENTS

Example 1

In order to illustrate the effectiveness of the present invention as a method for rendering bromonitrostyrene (BNS) relatively non-toxic, a representative number of tests were performed utilizing an exemplary number and type of oxidizing agents. The tests were carried out utilizing dechlorinated tap water having a temperature of approximately $20° \pm 1°$ C. and a pH value of 6.9 to 7.7. The pH and oxygen content and temperature of the water were maintained substantially constant during each of the tests in order to maintain a proper control. In each of the tests five minnows (*Pimephales promelas*) were used and the water utilized for the particular tests possessed an initial dissolved oxygen value of approximately 10 mg./l. As apparent from Table 1 which follows, the test waters containing the bromonitrostyrene were quite toxic to the minnows. However, when the oxidizing agent was added to the waters and sufficient time for reaction was allowed (0.5 to 60 minutes depending upon the weight ratio of the oxidizing agent to the biocide and in the following cases for twenty minutes) the results were quite different.

TABLE 1

| Test | BNS (mg./l.) | Na$_2$SO$_3$ (mg./l.) | Survivors after (days)— | | |
|---|---|---|---|---|---|
| | | | 1 | 2 | 3 |
| 1 | 0.5 | | 0 | | |
| 2 | 1.0 | | 0 | | |
| 3 | 1.5 | | 0 | | |
| 4 | 0.5 | 1.5 | 5 | 5 | 5 |
| 5 | 1.0 | 3.0 | 5 | 5 | 5 |
| 6 | 1.5 | 4.5 | 5 | 5 | 5 |
| 7 | | | 5 | 5 | 5 |
| 8 | | | 5 | 5 | 5 |

Example 2

In order to establish the effectiveness of various other sulfites, sodium hydrosulfite, sodium bisulfite and sodium metabisulfite were tested in accordance with the procedure outlined above. The results of the tests are set forth in following Table 2.

TABLE 2

| Test | BNS (mg./l.) | Other additions | Initial population | Survivors after (days)— | | | |
|---|---|---|---|---|---|---|---|
| | | | | 1 | 2 | 3 | 4 |
| 9 | 0 | | 5 | 5 | 5 | 5 | 5 |
| 10 | 2 | | 5 | 0 | | | |
| 11 | 2 | 2 mg./l. $Na_2S_2O_4$ | 5 | 5 | 5 | 4 | 4 |
| 12 | 2 | 10 mg./l. $Na_2S_2O_4$ | 5 | 5 | 5 | 5 | 5 |
| 13 | 2 | 10 mg./l. $NaHSO_3$ | 5 | 5 | 5 | 5 | 5 |
| 14 | 2 | 2 mg./l. $Na_2S_2O_5$ | 5 | 5 | 5 | 5 | 5 |
| 15 | 2 | 10 mg./l. $Na_2S_2O_5$ | 5 | 5 | 5 | 5 | 5 |
| 16 | 2 | 2 mg./l. $Na_2SO_3$ | 5 | 5 | 5 | 5 | 5 |
| 17 | 2 | 10 mg./l. $Na_2SO_3$ | 5 | 5 | 5 | 5 | 5 |

Example 3

Tests 18 through 21 were performed in order to establish the effectiveness of such oxidizing agents as hydrogen peroxide and potassium permanganate. These tests were performed according to the procedure described earlier.

TABLE 3

| Test | BNS (mg./l.) | Other additions | Initital population | Survivors after (days)— | | | | |
|---|---|---|---|---|---|---|---|---|
| | | | | 1 | 2 | 3 | 4 | 6 |
| 18 | | | 5 | 5 | 5 | 5 | 5 | 5 |
| 19 | 2 | | 5 | 0 | | | | |
| 20 | 2 | 25 mg./l. $H_2O_2$ | 5 | 4 | 4 | 4 | 4 | (¹) |
| 21 | 2 | 5 mg./l. $KMnO_4$ | 5 | 5 | 5 | 5 | 5 | 5 |

¹ Not observed.

Example 4

In order to explore the nature of the detoxification involved in the present invention, an ultraviolet spectrophotometer scan of the reaction mixture of bromonitrostyrene and sodium sulfite was made and compared to a scan of a solution of bromonitrostyrene. The profiles were entirely different and substantiated the fact that the bromonitrostyrene had changed after reaction with the sodium sulfite.

Having thus described the invention, what is claimed is:

1. A process for significantly decreasing the toxic effect of bromonitrostyrene which comprises reacting the bromonitrostyrene with a sufficient quantity of a compound selected from the group consisting of a water-soluble sulfite compound, hydrogen peroxide and potassium permanganate.

2. A process according to claim 1 wherein the compound is a sulfite and is selected from the group consisting of an alkali metal sulfite, ammonium sulfite, an alkali metal hydrosulfite, ammonium hydrosulfite, an alkali metal bisulfite and ammonium bisulfite.

3. A process according to claim 2 wherein the water-soluble sulfide compound is an alkali metal sulfite or ammonium sulfite.

4. A process according to claim 1 wherein the bromonitrostyrene is present in an aqueous medium which is being passed to waste.

5. A process according to claim 1 wherein the bromonitrostyrene is reacted with from about 0.5 to about 30 parts by weight of said compound per part by weight of said bromonitrostyrene.

6. A process according to claim 5 wherein the compound is a sulfite and is selected from the group consisting of an alkali metal sulfite, ammonium sulfite, an alkali metal hydrosulfite, ammonium hydrosulfite, an alkali metal bisulfite and ammonium bisulfite.

7. A process according to claim 6 wherein the water soluble sulfite compound is an alkali metal sulfite or ammonium sulfite.

8. A process according to claim 6 wherein the bromonitrostyrene is present in an aqueous medium which is being passed to waste.

9. A process according to claim 8 wherein said aqueous medium is from a cooling water system.

10. A process according to claim 9 wherein said aqueous medium is from a pulp and paper system.

11. A process according to claim 9 wherein said bromonitrostyrene is reacted with from about 1 to about 13 parts by weight of the compound per part by weight of the bromonitrostyrene.

References Cited

UNITED STATES PATENTS 1,117,831  11/1914  Gans _____ 210—59 X
3,300,373  1/1967  Wolfson _____ 162—190

FOREIGN PATENTS 646,440  8/1962  Canada.

OTHER REFERENCES

Chem. Abstracts, 24, 5027c, (1930) (P.O.S.L.).
Chem. Abstracts, 34, 3265b (1940).
Clark, N.G., et al.: Nature, Oct. 12, 1963, page 171.

MICHAEL ROGERS, Primary Examiner

U.S. Cl. X.R.

162—190; 210—64; 260—646; 424—349